April 23, 1963 R. R. HARTVIKSEN 3,086,811
TRUCK TARPAULIN AND DRAGLINE MECHANISM
Filed July 13, 1959 4 Sheets-Sheet 1

Inventor
Rudolph R. Hartviksen
By Stevens Davis Miller + Mosher
Attorneys

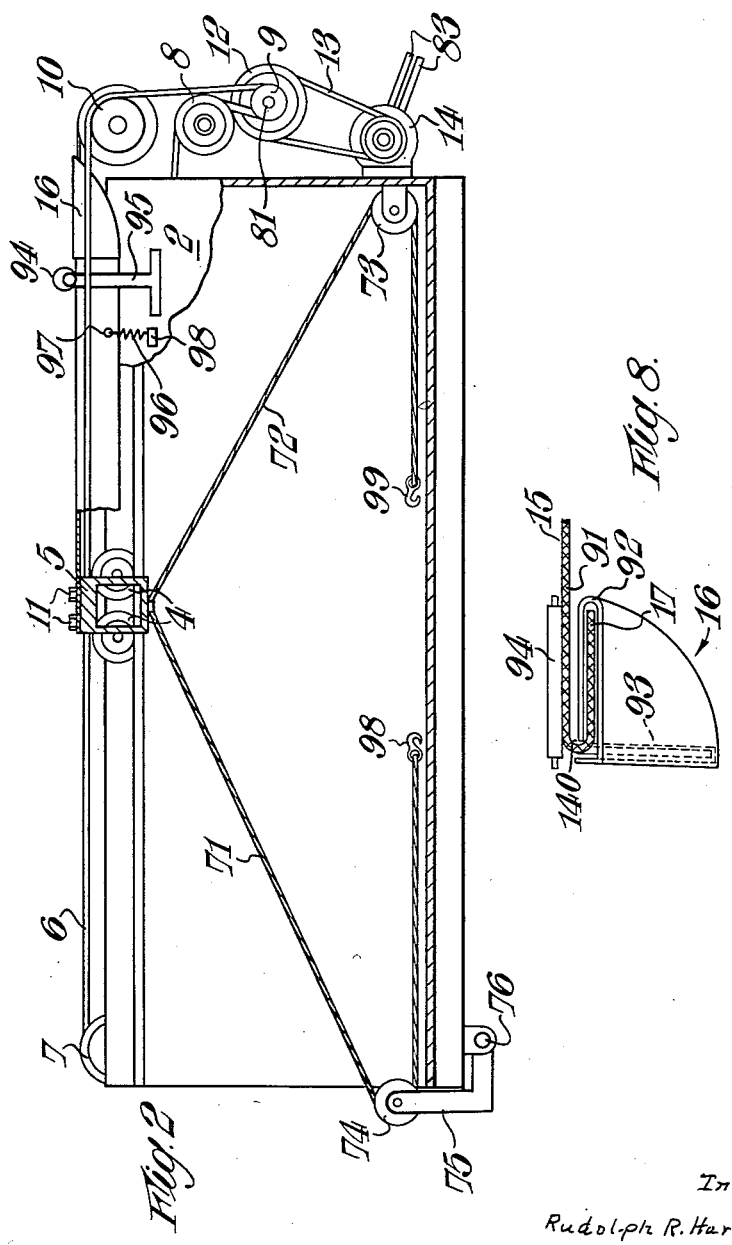

April 23, 1963 R. R. HARTVIKSEN 3,086,811
TRUCK TARPAULIN AND DRAGLINE MECHANISM
Filed July 13, 1959 4 Sheets-Sheet 3
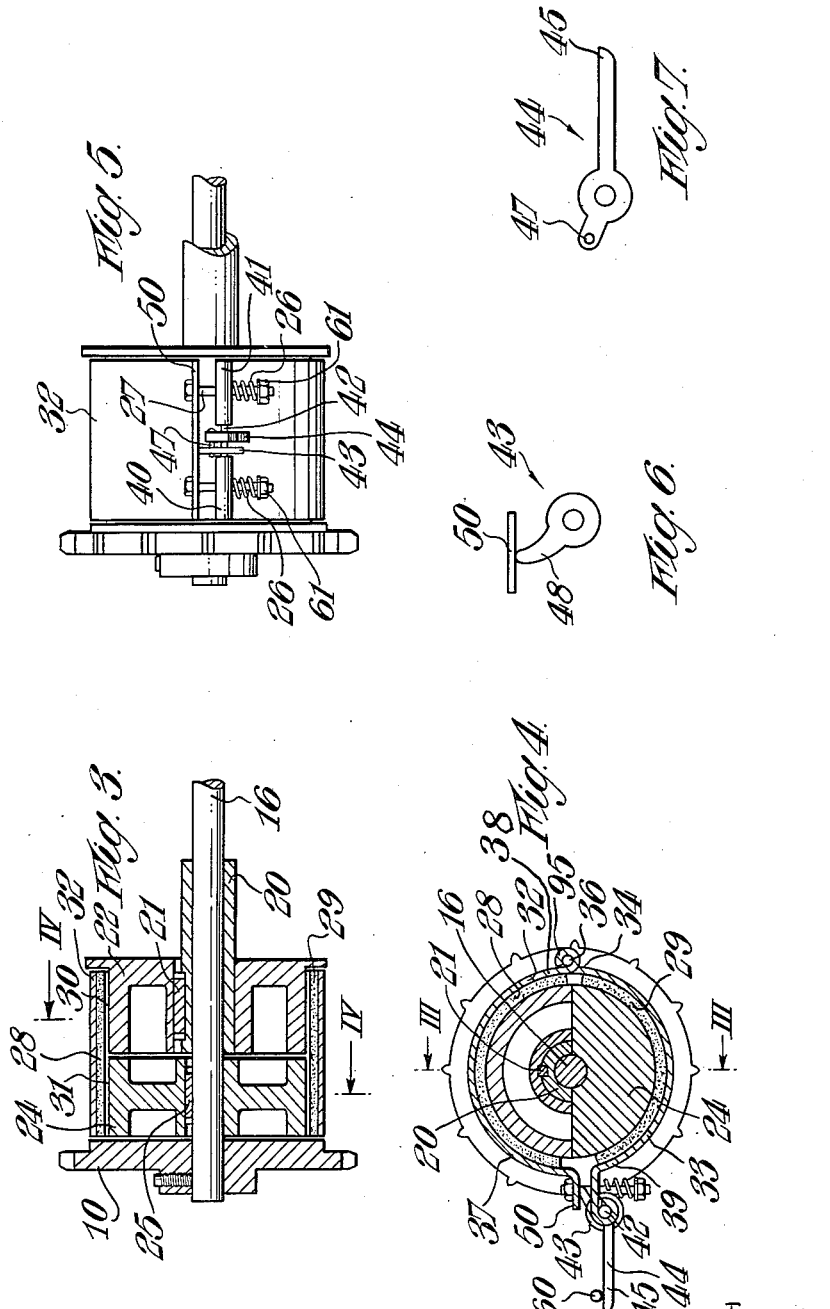
Inventor
Rudolph R. Hartviksen
By Stevens Davis Miller & Mosher
Attorneys

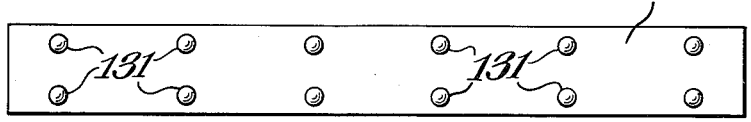
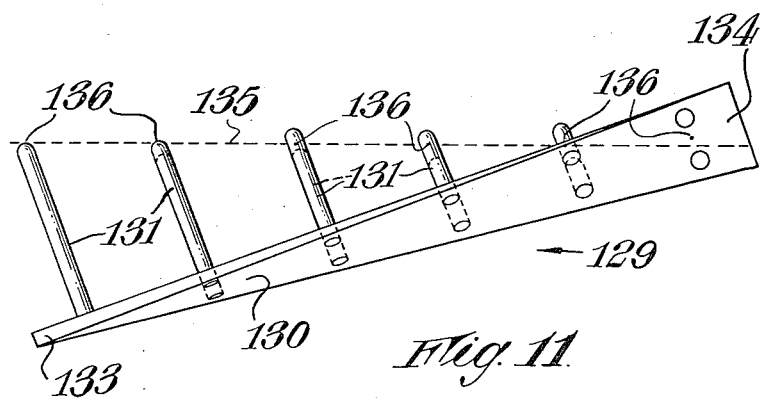

United States Patent Office 3,086,811
Patented Apr. 23, 1963

3,086,811
TRUCK TARPAULIN AND DRAINAGE
MECHANISM
Rudolph Rask Hartviksen, 178 Margaret St.,
Port Arthur, Ontario, Canada
Filed July 13, 1959, Ser. No. 826,750
Claims priority, application Canada July 21, 1958
8 Claims. (Cl. 296—98)

The present invention relates to freight-carrying vehicles, and has particular reference to freight-carrying vehicles for moving large loads, which loads should also be protected from the weather.

In freight-carrying trucks it is often necessary to have some haul-line system available so that heavy loads may be placed in the truck and there shifted to the required position in the freight compartment. It is also often necessary to provide tarpaulin protection. Such tarpaulins are, howover, of considerable weight, so that to extend one over the vehicle by hand is a difficult and awkward task.

It is an object of the present invention to provide a power-operated mechanism for extending the tarpaulin over such a vehicle, and at the same time to make a very efficient haul-line system available. It is a further object of the invention to provide a novel form of drive for a roller upon which the tarpaulin is wound up, so that undue stress in the tarpaulin canvas is avoided when the tarpaulin is rolled up, and to provide in addition means for disconnecting the drive to the roller when the tarpaulin is unwound.

According to the present invention I provide in a vehicle having a freight-carrying platform, a travelling bridge spaced from and above the platform supported to move across said platform means for moving the bridge, a tarpaulin or like flexible member wound upon a roller mounted above the platform, the free end of the tarpaulin being affixed to said travelling bridge, whereby movement of said bridge away from the roller draws said tarpaulin over said platform to provide a protected freight-carrying space between said platform and said tarpaulin, and clutch coupling means for driving said roller at such speed as to wind up said tarpaulin when the bridge is moved towards the roller.

According further to the invention, I provide in a vehicle having a freight-carrying platform, said platform having a freight discharge edge, a travelling bridge spaced from the platform supported to move across the platform, means for moving said bridge, a cable member having one end attached to said bridge and passing round pulley means mounted adjacent the discharge edge of said platform, means for taking up cable passing round said pulley when said bridge is moved towards said discharge edge whereby freight placed upon said platform is moved by said cable towards said discharge edge.

In the description of a specific embodiment of the invention which follows reference will be made to the drawings, in which:

FIG. 2 shows a side view partly in section on line II—II of FIG. 1.

FIG. 3 shows a detailed side elevation of the drive unit for the tarpaulin roller sectioned on line III—III of FIG. 4.

FIG. 4 shows an end view of the drive unit of FIG. 3 sectioned on the line IV—IV of FIG. 3.

FIG. 5 shows an outside side elevation of the drive unit.

FIG. 6 shows details of the clutch-release member.

FIG. 7 shows details of the arm for contacting the clutch-release member.

FIG. 8 shows a side elevation of a member for folding one edge of the tarpaulin sectioned on line VIII—VIII of FIG. 1.

FIG. 10 shows a plan view of a partly completed second type of member for folding the edges of the tarpaulin.

FIG. 11 shows the completed member of FIG. 10.

Figure 1:
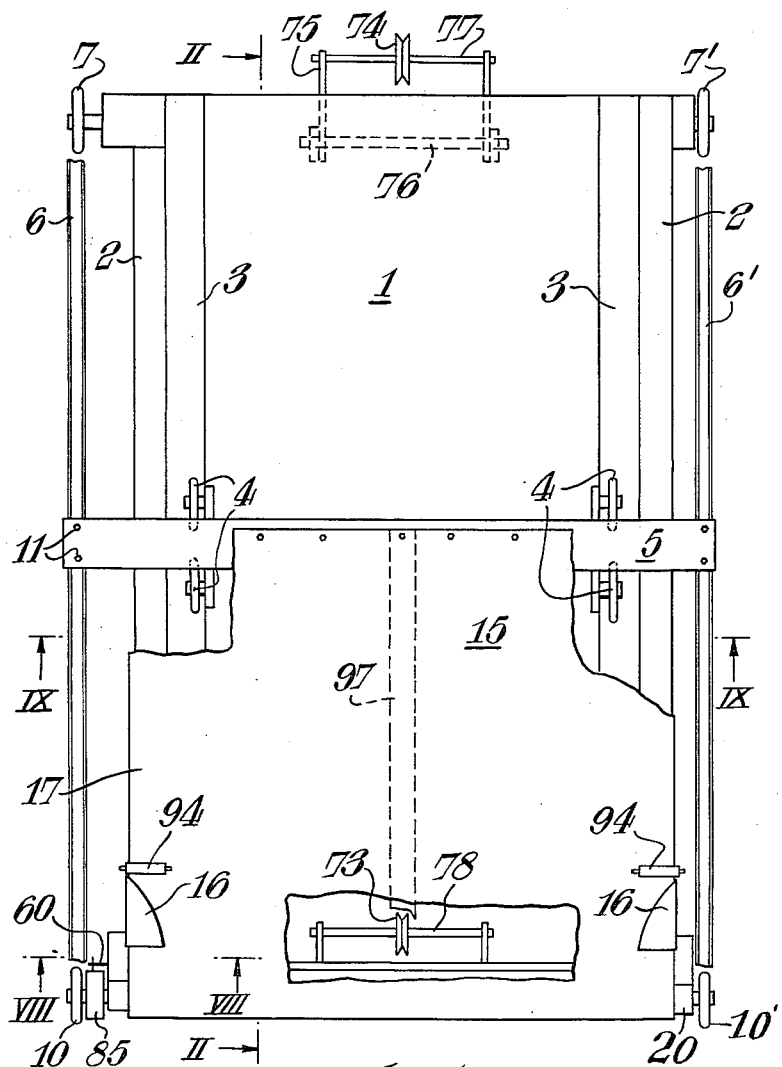
FIG. 1 shows a plan view of a freight vehicle, the tarpaulin shown as extended half way across the length of the vehicle.
Figure 9:
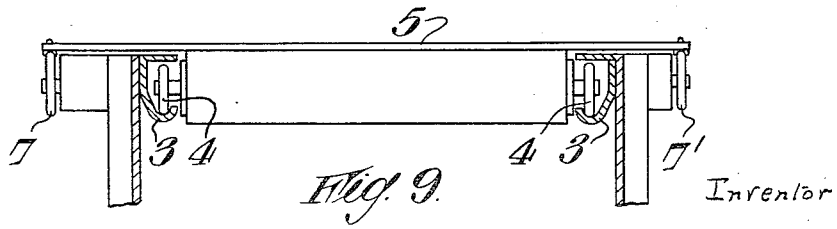
FIG. 9 shows a view of the travelling bridge as a section on line IX—IX of FIG. 1.

Referring to FIGS. 1 and 2, the vehicle, having freight carrying platform 1 and sides 2, is provided with horizontal rails 3 bolted to sides 2, upon which wheels 4 on either side of travelling bridge 5, spaced from and above the platform 1, are supported. The bridge 5 is driven by chains 6 and 6' located beyond each side 2 of the truck. Chain 6 passes in turn from travelling bridge 5 round sprockets 7, 8, and 9, then around sprocket 10, whence it passes to bolts 11 which fix it to the bridge 5. These sprockets 7, 8, 9, and 10 are all in the same plane. Chain 6' passes from bridge 5 round sprockets 7' and 10' and returns to the bridge. Sprockets 10 and 10' are coupled by means which will be described later. Movement of sprocket 9 in one direction or the other will bring about corresponding movement of the travelling bridge 5 from one end to the other of the vehicle. The sprocket 9 is directly coupled by a shaft 81 to a pulley wheel 12. A belt 13 drives pulley 12 from a hydraulic motor 14. Pipes 83 represent fluid supply and return lines for the hydraulic motor. It will be understood that other forms of drive for sprocket 9, such as from an independent gasoline engine, or mechanical drive from the vehicle motor, can be used in place of the hydraulic motor if desired. Power can thus be provided to move the bridge from one end to the other of the truck, exerting considerable force to achieve this movement if necessary. In certain instances it may be found desirable to dispense with machine drive for sprocket 9 and to make provision for a hand-operated crank (not shown) on sprocket 9, or indeed any one of the sprockets coupled to chain 6 or 6'.

A tarpaulin 15 or similar flexible cover member is wound on roller 20 which is coupled by drive unit 85 to sprocket 10. The free end of the tarpaulin is affixed to bridge 5. A flexible metal ribbon 97, which can wind upon and is attached to roller 20, is also provided at the centre of the tarpaulin 15 to support this when it is drawn over the freight platform 1. Folding members 16 through which the tarpaulin passes when being drawn from the roller 20 have surfaces of plough share shape which cooperate with the edges 17 of the tarpaulin so that the edges 17 are turned downwards to lie over the sides 2. When the tarpaulin 15 is drawn onto the roller 20 the edges 17 are tucked inwards to lie parallel to the remainder of the sheet. Details of members 16 are shown in FIG. 8, which represents an enlarged section on lines VIII—VIII of FIG. 1. When being fed from the roller 20, part of the main sheet of the tarpaulin passes over the top surface 91 whereas the edge 17 of the sheet passes through slot 92. The slot 92 is so shaped that the edge 17 of the tarpaulin 15 is swung downwards and passes out through slot 93. By this means a double layer of tarpaulin may be formed at the outer edges of the roll when wound on the roller 20 thus avoiding the need to extend the roller beyond the sides 2 to accommodate the edges 17. A roller 94 adjacent each member 16 is resiliently mounted on a bracket 95 from the side 2 of the freight vehicle and is designed to prevent the tarpaulin 15 from lifting when being folded or unfolded, thereby assisting in the smooth passage of the tarpaulin through members 16. A device which is convenient to make and which may be substituted for the members 16 is shown before completion in FIG. 12 and after completion in FIG. 13. This comprises a metal base member 130 into which are fitted in pairs along its length a plurality of posts 131. The space separating each post of a pair is large enough comfortably to permit an edge 17 of the tarpaulin to pass between. The height of each post 131 is substantially the same as that of an edge 17. The assembly of FIG. 12 is then shaped to that of FIG. 13 by twisting one end 133 of the base 130 through 90 degrees relatively to the other end 134 to produce device 129. The device 129 is then mounted with the line 135 joining the points 136 midway between the tops of each pair of posts 131 along the axis of folding 140 (see FIG. 8). An edge 17 accommodated between the pairs of posts 131, is caused to be rotated through 90 degrees in a similar manner to that achieved by the member 16 as the tarpaulin 15 moves in the direction of line 135.

When the tarpaulin 15 has been extended across the freight compartment its edges are fastened in position by means of a plurality of hold down springs 96 attached to the sides 2 at spaced intervals along the sides. These springs 96 each cooperate with an eye 97 in the tarpaulin. The spring 96 may be attached to fixed mountings 98 or to movable mountings (not shown) which enable the springs 96 to be pulled down tightly after they have been inserted into eyes 97.

The slip clutch mechanism 85 associated with sprockets 10 and 10' for driving the tarpaulin roller 20 is shown in FIGS. 3, 4, and 5. Roller 20 is a tube which encloses but does not bind shaft 16. Shaft 16 runs from one side to the other of the vehicle coupling together sprockets 10 and 10' so that these will always rotate at the same speed and therefore drive chains 6 and 6' at the same speed. Keyed to the end of tube 20 by pin 21 is a cylindrical member 22. Placed adjacently to member 22 is a further cylindrical member 24, which is keyed by pin 25 to shaft 16. Upon the outer surfaces 30 and 31 of the two cylindrical members 22 and 24 there is placed a brake assembly 32 which is held closed by springs 26 on bolts 27, such that the outer surfaces 30 and 31 are firmly engaged by brake linings 28 and 29. By this means a coupling between tube 20 and shaft 16 is provided. The lower brake lining mounting shoe 33 of brake assembly 32 is forged into an eye at one end 34 and is hinged to the upper brake shoe 37 by a pin 36 which passes through an eye 95 similar to that on end 34 formed at the end 38 of upper shoe 37. The other end 39 of shoe 33 is forged into two eyes 40 and 41 which support a shaft 42, upon which, free to rotate, is a disengaging assembly comprising two arms 43 and 44.

Details of arms 43 and 44 are shown in FIGS. 6 and 7 respectively. Arm 43 contacts the upper brake shoe 37 at end 50 such that rotation of this arm in a clockwise direction about pin 42 in the view of FIG. 4, will pry apart the two brake shoes 33 and 37 against the action of springs 26 and 27, whereby the linings 28 and 29 will loosen their grip upon surfaces 30 and 31, thus disengaging them. The rotation of arm 43 is achieved by means of arm 44, by depressing lever portion 45 such that projecting pin 47 contacts the underside 48 of arm 43.

The extent of the coupling between tube and shaft can be varied, compressing or releasing springs 26, by rotation of the nuts 61 on bolts 27. The friction coupling member 85 can thus be made to yield at the maximum desirable torque, and enables adjustment to suit the weight and strength of the tarpaulin.

It will be appreciated, also, that, if a pin 60 is mounted upon the frame of the vehicle, rotation of the sprocket 10, and hence cylindrical member 24, in an anticlockwise direction will cause lever 45 to contact pin 60, thus drive from the sprocket 10 to roller 20 will not take place.

This situation corresponds to that in which the tarpaulin is being extended over the vehicle.

The operation of the clutch unit 85 is therefore as follows: when the tarpaulin is in the fully extended position over the platform 1, and it is desired to wind it up onto the roller 20, operation of motor 14 causes sprocket 10 to rotate. The rate of rotation of roller 20 at this position must be at least great enough to draw in the tarpaulin as rapidly as the bridge 5 moves towards the roller 20. Clearly as the tarpaulin 15 becomes wound upon roller 20 the effective diameter of the roller will increase. The tarpaulin would thus tend to be drawn in more rapidly than the bridge is moving, and stretching or tearing of the tarpaulin would occur. The provision of drive unit 85, however, ensures that when a certain limiting tension in the tarpaulin occurs, slipping of drive between sprocket 10 and roller 20 takes place. When the tarpaulin is in the wound position on roller 20 and it is desired to draw it over the freight platform, the roller 20 would tend to feed off the tarpaulin too rapidly as the bridge 5 moves away from the roller 20. However, the provision of the decoupling mechanism caused by the contacting of lever portion 45 of arm 44 against pin 60 effectively disconnects the drive to roller 20, thus enabling the tarpaulin to be pulled off the roller at a speed determined by bridge 5 only.

The system outlined above can conveniently be adapted to provide haul-lines for use in shifting equipment to, from, or within the vehicle. Such lines 71 and 72 are shown in FIG. 2, each being capable of passing round sheaves or pulley wheels 73 and 74 respectively. Hooks 98 and 99 are also provided on lines 71 and 72. It will be observed that the construction of bracket 75 upon which pulley 74 is mounted is such that the bracket 75 can be swung downwards about axle 76. This enables the pulley to be moved aside when line 71 is removed from it, and used for direct hauling of loads into the vehicle. Pulleys 74 and 73 are free to move axially along the length of shafts 77 and 78 respectively so that the angles of run on and run off of the respective lines 71 and 72 and the plane of rotation of the pulleys will automatically equalize themselves and avoid any tendency for the lines to jump off their respective pulleys when hauling loads displaced from the centre line of the vehicle.

I claim:

1. In a vehicle having a freight carrying platform, a travelling bridge spaced from the platform guide means for supporting and guiding said bridge to move across said platform, drive means cooperatively coupled to said bridge for moving the bridge, a roller mounted above the platform, a tarpaulin wound upon said roller, the free end of the tarpaulin being affixed to said travelling bridge, whereby movement of said bridge away from the roller draws said tarpaulin over said platform to provide a protected freight carrying space between said platform and said tarpaulin, and slip clutch coupling means connecting said roller to said drive means to rotate said roller to wind up said tarpaulin when said drive means moves said bridge towards said roller, said slip-clutch being so constructed and arranged to slip and limit connection between the drive means and the roller when said tarpaulin tends to be drawn onto said roller at a speed faster than that of travel of said bridge towards said roller, whereby a limiting tension is established in said tarpaulin.

2. The combination defined in claim 1 wherein the clutch coupling means for driving said roller comprises a friction coupling member between said roller and the means for moving said bridge.

3. The combination of claim 2 wherein said clutch coupling means comprises disengaging means for releasing said coupling member when movement of the bridge is away from the roller.

4. The combination of claim 2 wherein said friction coupling member is adjustable to vary the maximum torque which said coupling member may transmit.

5. The combination of claim 3 wherein said friction coupling member is adjustable to vary the maximum torque which said coupling member may transmit.

6. In a vehicle having a freight carrying platform; a travelling bridge spaced from the platform supported to move across said platform; means for moving the bridge; a roller mounted above the platform; a tarpaulin wound upon said roller; the free end of the tarpaulin being affixed to said travelling bridge, whereby movement of said bridge away from the roller draws said tarpaulin over said platform to provide a protected freight carrying space between said platform and said tarpaulin; and slip-clutch coupling means for driving said roller, said clutch coupling means comprising, a friction coupling member between said roller and the means for moving said bridge, and disengaging means for releasing said coupling member when movement of the bridge is away from the roller; at least one folding member for the tarpaulin situated adjacent said roller, said member defining a space for receiving an edge of said tarpaulin, said space being so defined to swing said edge downwardly from an initial position parallel to said tarpaulin when said tarpaulin is drawn off said roller.

7. The combination of claim 6 wherein said member includes surfaces of plough share shape for defining said space.

8. The combination of claim 6 wherein said member includes a plurality of pairs of posts for defining said space.

References Cited in the file of this patent
UNITED STATES PATENTS

| | | |
|---|---|---|
| 2,248,538 | Liebler | July 8, 1941 |
| 2,591,186 | Neitzke | Apr. 1, 1952 |
| 2,594,910 | Germann | Apr. 29, 1952 |
| 2,811,321 | La Baire | Oct. 29, 1957 |
| 2,828,876 | Parnie | Apr. 1, 1958 |
| 2,833,428 | Smith | May 6, 1958 |
| 2,898,147 | Horner | Aug. 4, 1959 |
| 2,967,733 | Amerine | Jan. 10, 1961 |

FOREIGN PATENTS

| | | |
|---|---|---|
| 278,862 | Great Britain | Oct. 20, 1927 |
| 754,351 | France | Nov. 6, 1933 |
| 1,066,784 | France | June 9, 1954 |